United States Patent
Pfeil et al.

(10) Patent No.: US 6,586,927 B2
(45) Date of Patent: Jul. 1, 2003

(54) HALL EFFECT POSITION SENSING IN A POWERED PARKING BRAKE SYSTEM

(75) Inventors: Michael C. Pfeil, South Charleston, OH (US); Gary C. Fulks, Spring Valley, OH (US); Douglas E. Poole, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/930,890

(22) Filed: Aug. 16, 2001

(65) Prior Publication Data

US 2003/0034774 A1 Feb. 20, 2003

(51) Int. Cl.[7] .................................................. G01B 7/15
(52) U.S. Cl. ................................ 324/207.2; 324/207.24
(58) Field of Search ...................... 324/207.11, 207.12, 324/207.13, 207.2, 207.22, 207.24, 251; 338/32 R, 32 H; 340/453

(56) References Cited

U.S. PATENT DOCUMENTS

| | | | | |
|---|---|---|---|---|
| 4,124,814 A | | 11/1978 | Lauerman | ................ 324/207.2 |
| 5,115,186 A | * | 5/1992 | Reinartz et al. | ........ 324/207.22 |
| 5,439,275 A | * | 8/1995 | Padula et al. | ................... 303/3 |
| 5,608,317 A | | 3/1997 | Hollmann | ................. 324/207.2 |
| 5,636,548 A | | 6/1997 | Dunn et al. | .................... 73/313 |
| 5,793,200 A | * | 8/1998 | Berrill | ...................... 324/207.2 |
| 5,825,287 A | * | 10/1998 | Zarybnicky, Sr. et al. | .. 340/453 |
| 6,100,681 A | * | 8/2000 | Tsuruta | .................... 324/207.2 |
| 6,160,395 A | | 12/2000 | Goetz et al. | ........... 324/207.21 |

* cited by examiner

*Primary Examiner*—Edward Lefkowitz
*Assistant Examiner*—Reena Aurora
(74) *Attorney, Agent, or Firm*—Scott A. McBain

(57) ABSTRACT

A linear position sensor that includes a plurality of Hall effect transducers enables reliable positioning of a parking brake cable. Coarse positioning sensing is provided by longitudinally spacing the Hall effect transducers such that not more than one transducer has a positively sloped output signal for a given position of a magnet connected to a parking brake cable actuator. Fine position sensing is provided by linear approximation of the output signal with an offset appropriate for the specific transducer having the sensed positively sloped output signal.

13 Claims, 4 Drawing Sheets ns in between
HALL EFFECT POSITION SENSING IN A POWERED PARKING BRAKE SYSTEM

CROSS REFERENCE TO PENDING APPLICATIONS

The present application is related to the co-pending and commonly owned U.S. Ser. No. 09/931,519, now U.S. Pat. No. 6,522,967 entitled "POWERED PARK BRAKE RELEASE ALGORITHM," filed on even date herewith by Michael C. Pfeil and Gary C. Fulks, and Paul F. Flanagan and which is hereby incorporated by reference herein in its entirety.

FIELD OF THE INVENTION

The present invention relates to a brake system, and more particularly, to a method and apparatus for sensing travel of parking brake release system.

BACKGROUND OF THE INVENTION

Most vehicle designs incorporate parking brakes. Typical parking brake configurations employ regular drum brakes on a rear wheel with a simple mechanical linkage to engage brake shoes to their respective drums. For instance, an actuator may pull a steel brake cable taut in response to an operator depressing a pedal, lever or button. The resultant tension on the cable is transferred to the end of a brake lever. Other cables may draw the brake shoes firmly against the drums in response to rotation of the lever. A release knob or button causes the actuator to return to its initial position, reintroducing slack into the cables and, consequently, disengaging the brake shoes.

The reliability and integrity of brake performance depends largely upon the manner in which the actuator releases tension in the brake cable. For instance, should the actuator release too much cable over-release will result. This condition requires the actuator to reel in excessive cable slack prior to a next application, translating into system delays and damage. Conversely, too little release of the cable may result in a brake drag. Such a condition occurs when the brake pads do not fully release. Brake drag retards vehicle performance while causing overheating and damage to brake pads and other system components.

To reduce the occurrence of over-release and drag, some brake manufacturers incorporate systems that use either position or periodic force adjustments to regulate cable release. In particular, one type of position adjustment is made by a position adjuster proximate to the actuator that periodically retracts cable slack to compensate for lining wear and stretching. Another type of position adjustment is made by a position-based release mechanism that consistently moves the actuator a preset distance that ideally corresponds to an optimum brake release point. The preset distance needs to be manually adjusted at service intervals to compensate for system wear factors. In practice, even if serviced regularly, cable stretching and other aging factors cause release points to substantially migrate in between adjustments, allowing the problems of over-release and brake drag. In addition, some users do not service the braking system regularly.

Closed loop position feedback is known in other types of powered mechanisms. In particular, improved position adjustment is achieved with linear position feedback from a sensor (e.g., linear variable displacement transducer (LVDT), linear resistive potentiometers, and optical sensors). However, these sensors are expensive and prone to reliability limitations due to wear and contaminants.

Consequently, a significant need exists for an improved powered parking brake system that avoids reliability degradation due to over-release of brake drag.

SUMMARY OF THE INVENTION

The present invention addresses these and other problems associated with the prior art with linear position sensing of a powered parking brake mechanism that increases reliability and thus reduces costs of servicing and repair. In particular, non-contact sensing of linear position of an actuator that linearly positions the parking brake cable readily identifies coarse linear position without extensive computational circuitry and processing.

Consistent with one aspect of the present invention, a position sensor, and a parking brake release mechanism that uses the position sensor, determine linear position by utilizing a plurality of Hall effect transducers that are arrayed to detect a magnet coupled to the parking brake release mechanism. The reliable performance of the Hall effect transducers increases reliable sensing of linear position.

Consistent with another aspect of the present invention, longitudinal spacing of the Hall effect transducers in combination with a known movement of the parking brake release mechanism advantageously indicates coarse linear position by detecting not more than one transducer that is operating in its positively sloped region. A simple comparison of output signals between two positions of the cable thus readily identifies the coarse linear position.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION OF SPECIFIC EMBODIMENTS

A linear position sensor that includes a plurality of Hall effect transducers enables reliable positioning of a parking brake cable. Coarse positioning sensing is provided by longitudinally spacing the Hall effect transducers, such that not more than one transducer has a positively sloped output signal for a given position of a magnet connected to a parking brake cable actuator. Fine position sensing is provided by linear approximation of the output signal with an offset appropriate for the specific transducer having the sensed positively sloped output signal.

Figure 1:
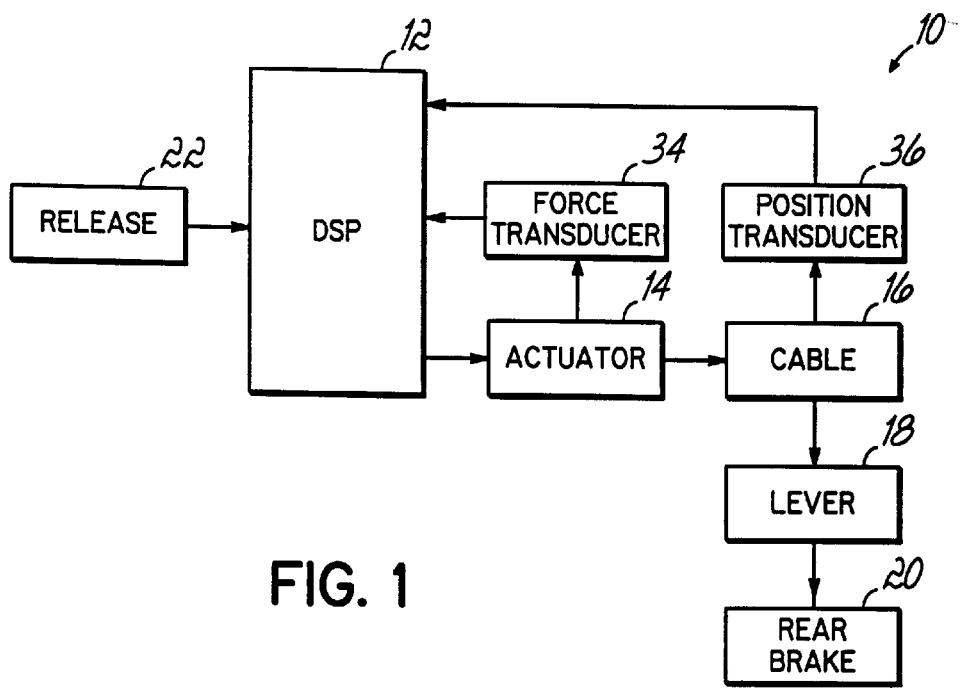
FIG. 1 depicts a block diagram of a parking brake system including parking cable position sensing consistent with aspects of the invention.

Turning to the Drawings, wherein like numbers denote like parts throughout several views, FIG. 1 illustrates a parking brake system 10 that is consistent with the principles of the present invention. Generally, a controller, depicted as microprocessor 12, executes a combined load/position algorithm configured to control the movement of a parking brake cable actuator 14. The illustrated embodiment couples the actuator 14 to a brake cable 16. The brake cable 16, in turn, attaches to a brake lever 18 operable to actuate rear drum/caliper brakes 20. As such, the travel of the actuator 14 causes a force to be transferred to the brake lever 18 via the cable 16.

An operator initiates a release sequence by actuating a release control 22, such as a button or switch. The release control 22 in turn transmits a release signal to the microprocessor 12. The microprocessor 12 generates a command according to a parking brake release algorithm that includes both force and position related functions. In particular, the 12 transmits a command to a small motor of the actuator 14. The illustrated actuator 14 advantageously incorporates a force sensor 34, a position sensor 36, a power screw and a gear set for gaining mechanical advantage. In response to the command, the actuator 14 travels along the axis of the brake cable 16. The movement of the actuator 14 incrementally releases cable tension according to a preset release sequence.

The force transducer 34, or other suitable force sensor, measures the load incident on the actuator 14. The forces acting on the actuator 14 are a product of the tension on the cable 16. Of note, force may be measured in terms of motor current, or by any other conventional standard. The transducer 34 relays the measured force back to the microprocessor 12. The microprocessor 12 continues to release the cable 16 via the actuator 14 until a preset load registers at the transducer 34. For instance, the actuator 14 may continue to transverse until zero pounds of force is indicated.

Once the preset load is achieved, the program advantageously instructs the Microprocessor 12 to transition from operation within the force control mode to that of position control mode. First, the current position of the actuator 14 is stored within the memory of the Microprocessor 12. While operating in position mode, the program releases the cable 16 an additional increment of distance via the actuator 14. The additional release may, in part, serve to account for marginal errors inherent to the transducer measurement. For instance, the transducer may erroneously register zero pounds when a fraction of force actually remains incident on the cable 16. Left uncorrected, the residual tension in the cable 16 causes the rear brakes 20 to remain engaged. Consequently, one embodiment of the program may instruct the Microprocessor 12 to drive the actuator 14 for a period corresponding to the additional increment. For example, the motor of the actuator 14 may cause the cable 16 to release an additional quarter inch.

The program determines the additional increment as a function of a transducer margin of error, a linearized spring ratio and other scaling factors. Specifically, the embodiment may rely on the following equation to calculate the additional increment, $x_0$:

$$x_0 = c * f_{err} / k_0$$

where $f_{err}$ corresponds to the margin of error associated with the sensor, c corresponds to a scaling factor to increase and otherwise adjust output for safety considerations, and $k_0$ corresponds to the linearized spring rate reflecting equipment-specific performance characteristics. The program may ultimately use the additional increment to calculate a release point for the operation.

In an illustrative embodiment, the Microprocessor 12 instructs the actuator 14 to proceed to a predetermined release point. The release point corresponds to a specific position along the actuator's path of travel. The program determines the release point as a function of a stored position and the calculated, additional increment. The stored position may correspond to a recorded position of the actuator 14 during the prior release operation. For instance, the Microprocessor 12 may store the position of the actuator 14 corresponding to the end of the force control cycle. The program may augment the stored position with the calculated additional increment. As such, the predetermined release point corresponds to the stored position plus the additional increment. The Microprocessor 12 may command the actuator 14 to travel until that release point along the axis of the cable 16 is achieved. A position measuring device, depicted as position sensor 36, monitors, verifies and reports the position of the actuator 14 back to the Microprocessor 12. Thus, the program will continue releasing the cable 16 until the actuator 14 traverses a distance which ensures fill release of the brake drums/calipers 20. Before ending the release operation, one embodiment may reemploy the force transducer to verify that no load is present on the actuator.

Figure 2:
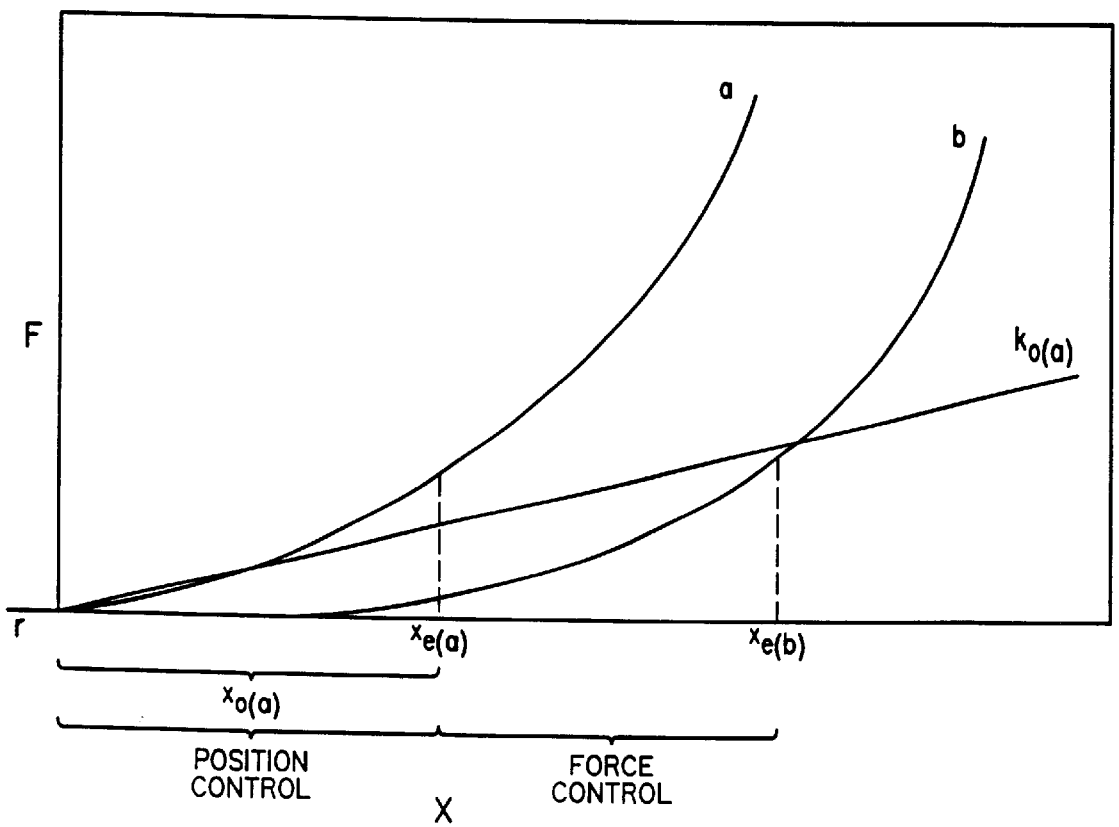
FIG. 2 is a graphical representation of forces acting on the linear actuator of FIG. 1 as the actuator transverses towards the rear brakes of the same figure.

FIG. 2 illustrates an empirical representation of the load, F, acting on the actuator of FIG. 1 relative to its distance, X, from the brake lever. As shown in the graph, line "a" depicts the nonlinear decrease of forces incident on the actuator during a release operation. Ideally, the actuator would continue to release brake cable until all load was removed from the actuator. As discussed above, however, inaccuracies associated with sensing devices can prematurely indicate a zero load condition. Such a premature reading is denoted on the graph as "$X_{e(a)}$". While the actual travel corresponding to this $X_{e(a)}$ may be less than an inch, it can nonetheless result in substantial system drag. That is, tension transferred to the brake lever from the cable is never completely relieved. As such, brake pads will continue to retard vehicle motion, harming system components and performance. Of note, the consequences of erroneous readings can become more pronounced over time, as illustrated by line "b". More particularly, line b represents the cumulative effects of use and aging for the same system as line a. As shown in the graph, the slope of curve b has decreased as a result of cable stretching and other wear. Significantly, the position corresponding to zero load for line b has also changed. Consequently, should the release operation abruptly end within force control mode, the actuator may fail to release an adequate amount of cable. While the force control mode can help accommodate changing load requirements, a position control parameter may still be needed to account for measurement error.

Consequently, the illustrative embodiment of the invention causes the actuator to travel an additional increment, $x_{0(a)}$. This distance ensures the removal of any undetected force incident on the cable. Particularly, the position control mode calculates $x_{0(a)}$ in such a manner that it is always larger than $x_{e(a)}$. As discussed above for FIG. 1, the program determines $x_{0(a)}$ as a product of the transducer error and the linear spring constant. Returning to FIG. 2, line $k_{0(a)}$ graphically represents such a linear spring constant. The slope of line $k_{0(a)}$ correlates to the differential equation of actuator force over position at F=0. Of note, the slope and associated value of $k_{0(a\&b)}$ adjusts as the system ages. Ultimately, the calculation may combine an additional increment $x_{0(a)}$ with a stored position $x_{e(b)}$ to arrive at a release point, r.

Figure 3:
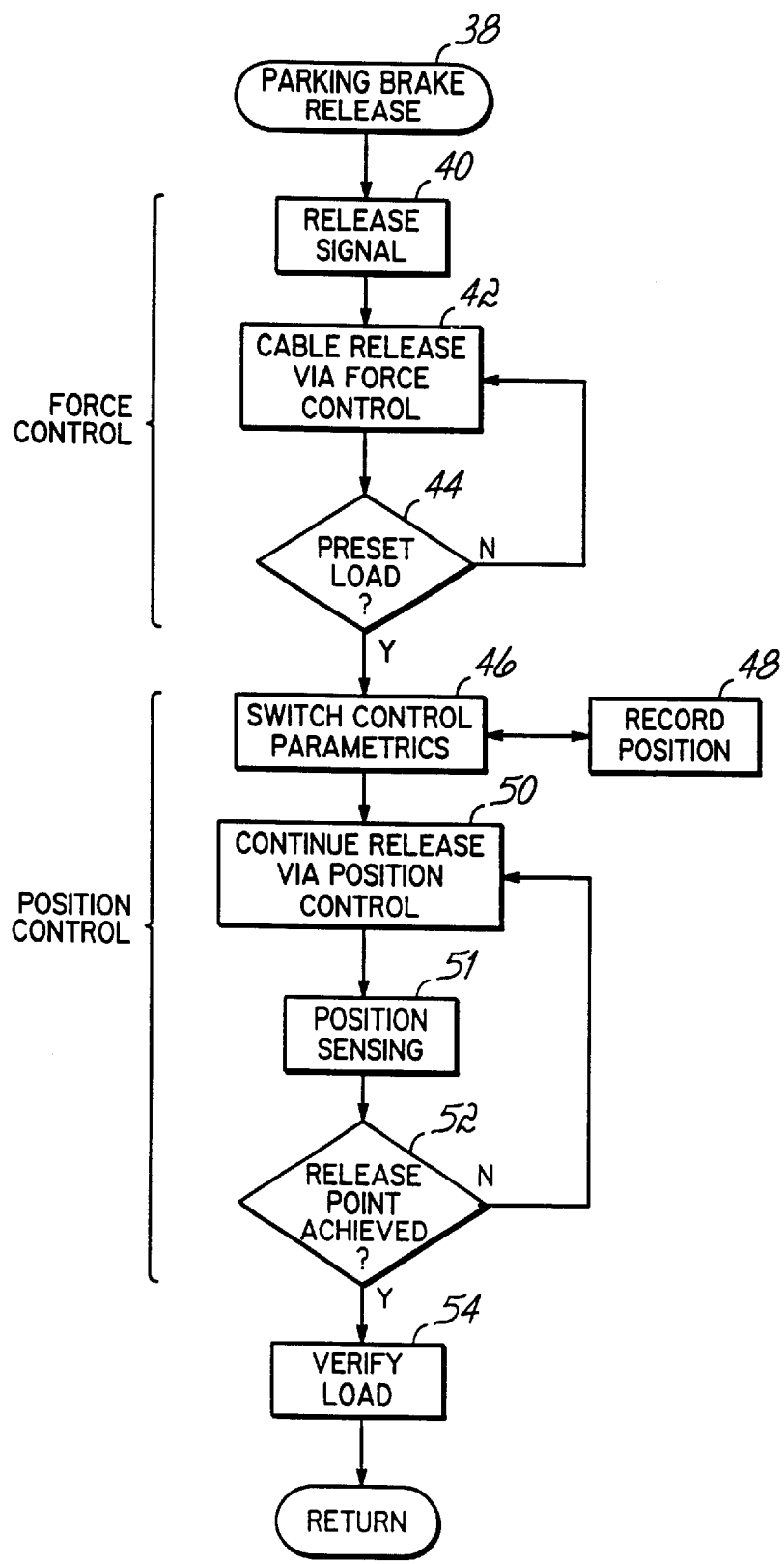
FIG. 3 illustrates a sequence of operation for parking brake release of the parking brake system of FIG. 1.

The flowchart of FIG. 3 illustrates a sequence of operation or routine 38 for parking brake release suited for implementation within the brake system environment of FIG. 1. At block 40, a user pushes a button or pulls a lever configured to initiate a release signal. An actuator transverses in such a manner as to release a brake cable according to a preset sequence. Tension from the cable is transferred to the actuator. A transducer housed on the actuator concurrently measures the tension or load, incident on the actuator at block 42. The sensor at block 44 determines whether a preset force level is present. If not, then the control returns to block 42 to continue releasing the cable and monitoring for the preset load.

If the preset load level is determined at block 44, then the mode switches to position control mode (block 46). That is, a control signal is generated in response to a force transducer reading of zero pounds. The control signal also causes the routine to record the current position of the actuator at block 48. The position control protocol applies this stored position at block 46 when calculating a position release point.

At block 48, the actuator is released some additional incremental distance (block 50). A position sensor continuously monitors the position of the actuator at block 51. The measurements may be concurrent with the release of the cable. The cable is released until the actuator arrives at the position release point as determined in block 52. As discussed in detail above, the release point is a function of a stored element position, transducer error, spring ratio and other scaling factors. More particularly, the position stored at block 48 during a prior application may be augmented with an additional increment of distance. This additional increment reduces the occurrence of drag. Once the release point is reached, verification is made and the load is removed from the brake cable (block 54).

Figure 4:
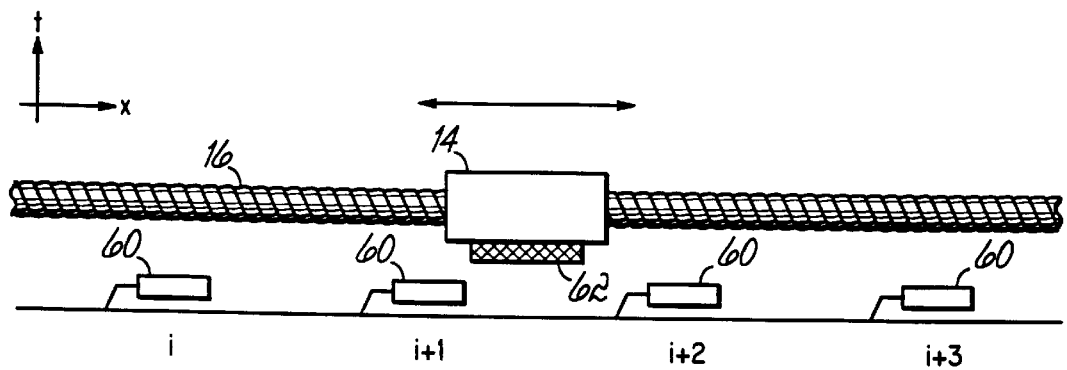
FIG. 4 is a side view of cable position sensing of the linear actuator of FIG. 1.

Turning to FIG. 4, the position sensor 36 is depicted as comprised of a longitudinal spacing of Hall effect transducers 60, individually noted by a longitudinal offset of "i", "i+1", "i+2", etc. These transducers 60 are proximate a magnet, such as a rare earth permanent magnet 62 mounted to the linear actuator 14. It will be appreciated that placing the magnet 62 directly on the linear actuator 14 to determine travel is illustrative. The magnet 62 may be placed on any element that moves in concert with the actuator 14 and the cable 16. Alternatively, the transducers 60 may be placed for movement with the actuator 14 and cable 16 with the magnet 62 affixed to a proximate stationary surface. Consequently, swapping placement of the magnet 62 and transducers 60 is contemplated in some applications consistent with the invention.

Figure 5:
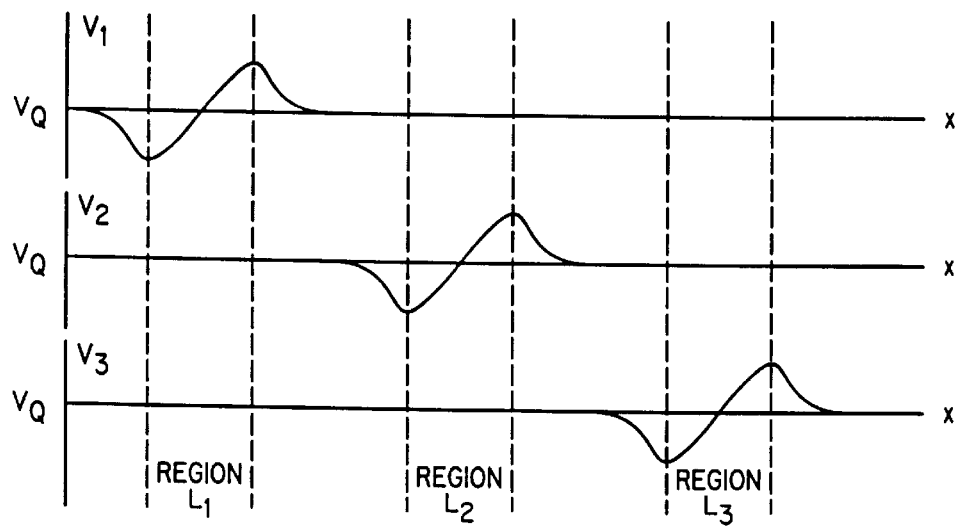
FIG. 5 is a plot of quiescent voltage, as a function of the position of the linear actuator of FIG. 4. of a plurality of longitudinally spaced Hall effect transducers of the cable position sensor.

The spacing of the individual transducers 60 advantageously allows for detecting a significant range of linear positions. In particular, for the plot of output signals depicted in FIG. 5, the longitudinal spacing is sufficient such that not more than one transducer is operating in its positively sloped linear region. Consequently, the corresponding offset "i+n" for the transducer provides the coarse positioning for a sensed linear position x. Moreover, to obtain even a greater range of linear position sensing for the same number of transducers 60, the longitudinal spacing is increased to the point where regions exist for linear positions x where no transducer outputs a positively sloped output signal. The region is advantageously selected for the resolution requirements of the application.

Figure 6:
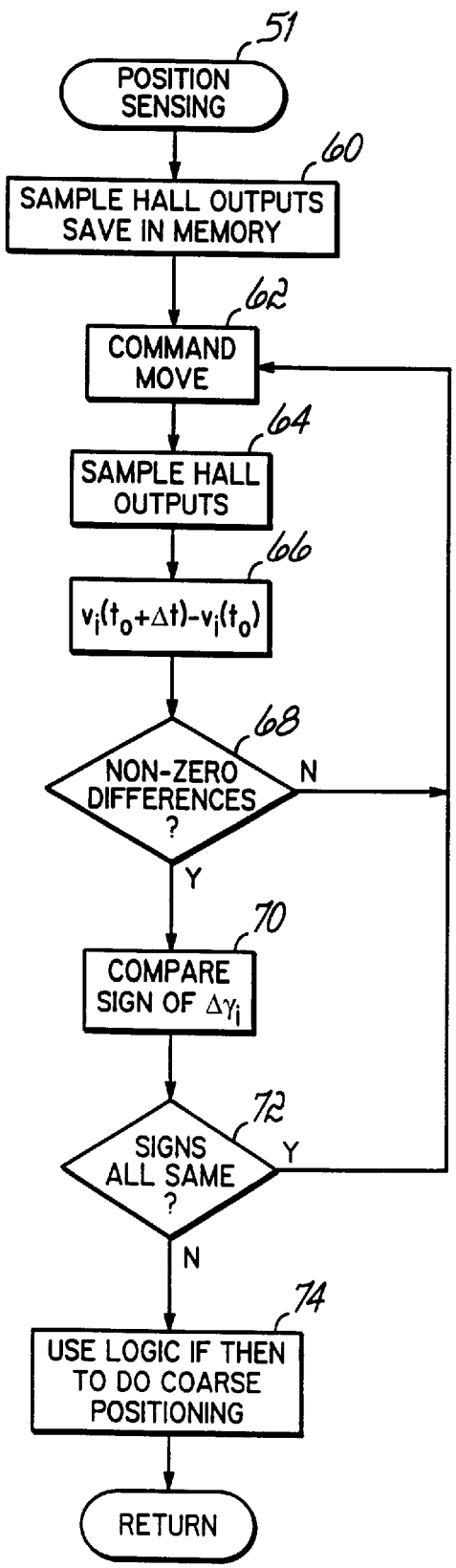
FIG. 6 is a sequence of operations for position sensing referenced in the parking brake release routine of FIG. 3.

Turning to FIG. 6, a sequence of operations is depicted for position sensing 51, referenced in FIG. 3. In the illustrative example, a commanded direction of movement need not be known since the appropriate transducer is selected by having a nonzero sign of opposite sign than the others. First, each Hall effect transducer provides an analog voltage output signal as a function of the relative position of the magnet. Each output signal is sampled at a predetermined time (block 60). Then, the actuator is commanded to move the parking brake cable an increment (block 62). Then, for each Hall effect transducer, the output signal is sampled again (block 64). A comparison is made of the respective two samples of the output signal taken from the particular Hall effect transducer (block 66).

A determination is made based on the current comparison (i.e., a derivative of the output signals) as to whether any non-zero differences, or derivatives, were sensed (block 68). If not, then the linear position x is in a region between transducers 60 and a buffered or extrapolated linear position is used until a non-zero derivative of an output signal is found. Thus, control returns to block 64. If in block 68 a non-zero derivative was found, then the signs of each non-zero derivative are compared (block 70). If all of the signs are the same (block 72), then the non-zero derivatives indicate that none of the transducers are in a positively sloped region of their output signal, and thus control returns to block 64 to continue monitoring for a valid output signal.

If all of the signs are not the same in block 72, then a logical determination is made as to which output signal had the non-zero difference that differed from the others (block 74). For instance, the output signal closest to the last buffered linear position may be selected if two non-zero differences are detected of opposite sign. In addition, a direction of movement may be known and the appropriate sign indicate which of two output signals are appropriate. Furthermore, one output signal of one sign may be flanked by two output signals of opposite sign, indicating that the center output signal is operating in its positively sloped region.

In some applications, by knowing the direction of the commanded movement, it will be known whether an output signal with a positive slope would be indicated by a first sample that is greater than the second sample, or less than. Thus, a positively sloped output signal would be apparent by having a comparison of this sign while the other output signals are zero or of the oppositive sign.

In use, a parking brake release control 22 is actuated to produce a release signal. The Microprocessor 12 of the parking brake system 10 commands the actuator 14 to move to relieve tension on the parking brake cable 16 to release the wheel brakes. Once the preset force level is reached, such as no sensed load, then the Microprocessor 12 commands position control mode by using the position sensor 36 to sense a magnet 62 on the actuator 14. In particular, Hall effect transducers 60 produce output signals. The Microprocessor 12 detects no more than one transducer 60 that is producing a signal in its positively sloped region by sampling the output signal, commanding a move by the actuator, and sampling the output signal again. The offset for the transducer 60 is used for a coarse position signal. A linear approximation for the output signal with the offset provides the fine position signal.

By virtue of the foregoing, a powered parking brake system 10 incorporates Hall effect transducers 60 and magnet 62 as a position sensor 36 that are not prone to damage from contact or contamination. Thus, position sensing reliably releases the parking brake without brake damage due to brake drag from under release, nor undue vibration and damage to the parking brake system 10 due to over-release.

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of applicants' general inventive concept.

What is claimed is:

1. A method of determining a linear position of an actuator in a parking brake system using a plurality of Hall effect transducers mounted proximate to a magnet coupled for linear movement with the actuator, each Hall effect transducer being longitudinally spaced from each other such that not more than one transducer produces output signals having increasing amplitude at a particular time during movement of the actuator, the method comprising:

sensing a first plurality of output signals respectively from the plurality of Hall effect transducers;

a second plurality of output signals respectively from the plurality of Hall effect transducers in response to movement of the actuator; and determining a coarse linear position of the actuator by comparing each first with the corresponding second output signal of the respective plurality of Hall effect transducers, and setting the coarse position of the actuator to a position value associated with the one Hall effect transducer that produces output signals having increasing amplitude during movement of the actuator.

2. The method of claim 1, further comprising:

determining a fine linear position of the actuator by a linear approximation.

3. The method of claim 1, further comprising:

storing at least one previously determined linear position value of the actuator in memory.

4. The method of claim 3, wherein the plurality of Hall effect transducers are longitudinally spaced such that a range of linear positions of the actuator exist between each Hall effect transducer wherein no Hall effect transducer produces output signals having increasing amplitude during movement of the actuator, the method further comprising:

moving the actuator in response to sensing no Hall effect transducer producing outputs having increasing amplitude during movement of the actuator; and associating the stored position value of the actuator as the coarse position of the actuator.

5. A position sensor for determining a linear position of a powered parking brake mechanism, comprising:

a magnet coupled for linear movement with the powered parking brake mechanism to a position along a longitudinal range;

a plurality of Hall effect transducers aligned proximate to the longitudinal range of the magnet, each Hall effect transducer being longitudinally spaced from each other such that not more than one transducer produces output signals having increasing amplitude at a particular time during movement of the magnet; and a controller responsive to the output signals produced by each Hall effect transducer to determine the linear position of the magnet.

6. The position sensor of claim 5, wherein the controller is configured to determine a coarse position of the magnet by sensing a first plurality of output signals from the respective plurality of Hall effect transducers, sensing a second plurality of output signals from the respective plurality of Hall effect transducers upon movement of the magnet, and setting the coarse position of the magnet to a position value associated with the one Hall effect transducer that produces output signals having increasing amplitude during movement of the magnet.

7. The position sensor of claim 6, wherein the plurality of Hall effect transducers are further sufficiently spaced from one another that a region of the longitudinal range exists between each pair of Hall effect transducers wherein no Hall effect transducer produces output signals having increasing amplitude during movement of the magnet, the controller further being configured to access a stored previously determined position value of the magnet and to associate the stored position value of the magnet as the coarse position of the magnet.

8. The position sensor of claim 6, wherein the controller is further configured to determine a fine position of the magnet by a linear approximation.

9. A parking brake release mechanism for powered release of a parking brake cable coupled to wheel brakes, the parking brake release mechanism comprising:

an actuator configured to linearly position the parking brake cable;

a magnet coupled for linear movement with the actuator along a longitudinal range;

a plurality of Hall effect transducers aligned proximate to the longitudinal range of the magnet, each Hall effect transducer being longitudinally spaced from each other such that not more than one transducer produces output signals having increasing amplitude at a particular time during movement of the actuator; and a controller responsive to the output signals produced by each Hall effect transducer to determine the linear position of the actuator.

10. The parking brake release mechanism of claim 9, wherein the controller is configured to determine a coarse position of the actuator by sensing a first plurality of output signals from the respective plurality of Hall effect transducers, sensing a second plurality of output signals from the respective plurality of Hall effect transducers upon movement of the actuator, and selecting the coarse position of the actuator to a position value associated with the one Hall effect transducer that produces output signals having increasing amplitude upon movement of the actuator.

11. The parking brake release mechanism of claim 9, wherein the plurality of Hall effect transducers are further sufficiently spaced from one another that a region of the longitudinal range exists between each pair of Hall effect transducers wherein no Hall effect transducer produces output signals having increasing amplitude during movement of the actuator, the controller further configured to access a stored previously determined position value of the actuator and to associate the stored position value of the actuator as the coarse position of the actuator.

12. The parking brake release mechanism of claim 9, wherein the controller is further configured to determine a fine position of the actuator by a linear approximation.

13. A method of determining a linear position of an actuator in a parking brake system using a plurality of Hall effect transducers mounted proximate to a magnet coupled for linear movement with the actuator, which Hall effect transducer being longitudinally spaced from each other such that not more than one transducer operates in a linear output range of the transducer at a particular time during movement of the actuator, the method comprising:

sensing a first plurality of output signals respectively from the plurality of Hall effect transducers;

sensing a second plurality of output signals respectively from the plurality of Hall effect transducers in response to movement of the actuator; and determining a coarse linear position of the actuator by comparing each first with the corresponding second output signal of the respective plurality of Hall effect transducers, and setting the coarse position of the actuator to a position value associated with the one Hall effect transducer that is operating in its linear output range during movement of the actuator.

* * * * *